US012621213B2

(12) United States Patent
Hu et al.

(10) Patent No.: US 12,621,213 B2
(45) Date of Patent: May 5, 2026

(54) METHOD AND SYSTEM FOR MULTI-STAGE TOPOLOGY RECONFIGURATION OF DISTRIBUTION NETWORK BASED ON GRAPH COMPUTING

(71) Applicant: STATE GRID NANJING SUPPLY POWER COMPANY, Nanjing (CN)

(72) Inventors: Zijian Hu, Nanjing (CN); Hong Zhu, Nanjing (CN); Xiaofeng Wang, Nanjing (CN); Zhan Lv, Nanjing (CN); Honghua Xu, Nanjing (CN); Weiliang Wang, Nanjing (CN); Zhiwei Zhang, Nanjing (CN); Jianhua Zhou, Nanjing (CN); Xiaodong Cao, Nanjing (CN); Yandi Wang, Nanjing (CN); Qilong Qian, Nanjing (CN); Ziqiang Xu, Nanjing (CN); Ye Ji, Nanjing (CN); Mingming Cai, Nanjing (CN)

(73) Assignee: STATE GRID NANJING SUPPLY POWER COMPANY, Nanjing (CN)

( * ) Notice: Subject to any disclaimer, the term of this patent is extended or adjusted under 35 U.S.C. 154(b) by 0 days.

(21) Appl. No.: 19/232,553

(22) Filed: Jun. 9, 2025

(65) Prior Publication Data

US 2026/0032054 A1 Jan. 29, 2026

Related U.S. Application Data

(63) Continuation of application No. PCT/CN2025/090377, filed on Apr. 22, 2025.

(30) Foreign Application Priority Data

Jul. 23, 2024 (CN) .......................... 202410985204.9

(51) Int. Cl.
H04L 41/12 (2022.01)
H04L 41/0813 (2022.01)

(52) U.S. Cl.
CPC .......... *H04L 41/12* (2013.01); *H04L 41/0813* (2013.01)

(58) Field of Classification Search
CPC .......................... H04L 412/12; H04L 41/0813
(Continued)

(56) References Cited

FOREIGN PATENT DOCUMENTS

CN 103427484 A * 12/2013
CN 107741999 A 2/2018
(Continued)

OTHER PUBLICATIONS

1st Chinese Office Action for CN 202410985204.9 mailed Aug. 29, 2024 (Aug. 29, 2024), 3 pages (English translation—4 pages).
(Continued)

*Primary Examiner* — Sibte H Bukhari
(74) *Attorney, Agent, or Firm* — CM Law; Stephen J. Weed

(57) ABSTRACT

Provided are a method for multi-stage topology reconfiguration of a distribution network based on graph computing and a system for multi-stage topology reconfiguration of a distribution network based on graph computing. The method includes providing a distribution network reconfiguration method based on the optimal flow pattern method and the branch exchange method; constructing a multi-stage reconfiguration model for the distribution network with an optimal power loss model; providing a multi-stage reconfiguration calculation method for the distribution network based on graph computing; and solving the optimal power loss model based on graph computing to obtain the distribution network reconfiguration technique.

6 Claims, 5 Drawing Sheets

(58) Field of Classification Search
USPC .......................................................... 370/254
See application file for complete search history.

(56)                    References Cited

FOREIGN PATENT DOCUMENTS

| | | | | | |
|---|---|---|---|---|---|
| CN | 107944639 | A | | 4/2018 | |
| CN | 108054738 | A | * | 5/2018 | .............. H02J 3/381 |
| CN | 114094574 | A | | 2/2022 | |
| CN | 115238423 | A | | 10/2022 | |
| CN | 115238426 | A | | 10/2022 | |
| CN | 118520624 | A | | 8/2024 | |
| WO | 2023002337 | A1 | | 1/2023 | |

OTHER PUBLICATIONS

Jiang, Wei et al.: "Calculation of Power Supply Reliability for Distribution Network Based on Neo4j Graph Database," Automation of Electric Power Systems, Oct. 31, 2021 (Oct. 31, 2021), 18 pages, English abstract.
Jinyuan, Shi et al.: "A Distributed Three Layer Topology Analysis Method Based on Graphx and Implementation for Medium and Low Voltage Distribution Network Topology Analysis," IEEE Sustainable Power & Energy Conference, Dec. 22-25, 2021, Nanjing China, 6 pages.
Xu, Peng et al.: "Research on online topology optimization strategy of distribution network based on deep reinforcement learning," China Academic Journal Electronic Publishing House, vol. 26, No. 3, May 2022, 6 pages, English abstract.
Deng Peng, Liu Min, Cao Peng, Chen Mingyang; "Research on Probabilistic Power Flow Reconfiguration of Distribution Network Based on Improved Heuristic Algorithm;" Electronic Power Science and Engineering, vol. 37, No. 8, ISSN: 1672-0792, p. 33-40, Aug. 31, 2021 (Aug. 31, 2021).
International Search Report for International Application No. PCT/CN2025/090377, dated Jul. 19, 2025 (Jul. 19, 2025)—2 pages (English Translation—2 pages).

* cited by examiner

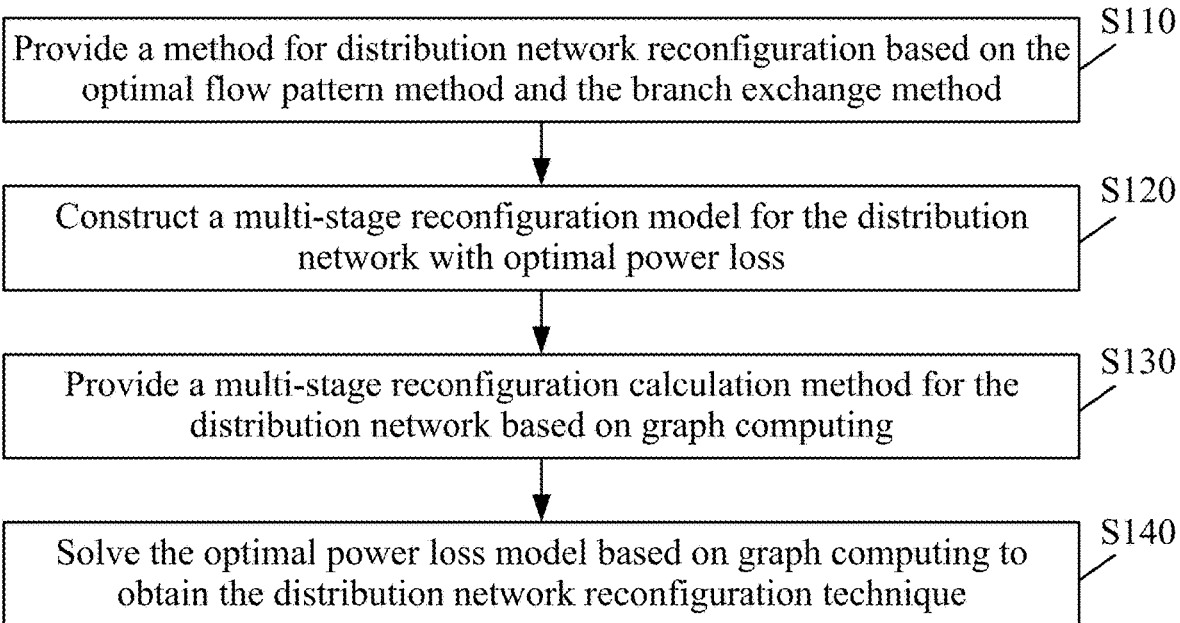

Provide a method for distribution network reconfiguration based on the optimal flow pattern method and the branch exchange method — S110

Construct a multi-stage reconfiguration model for the distribution network with optimal power loss — S120

Provide a multi-stage reconfiguration calculation method for the distribution network based on graph computing — S130

Solve the optimal power loss model based on graph computing to obtain the distribution network reconfiguration technique — S140

FIG. 1A

Divide a to-be-reconfigured distribution network into multiple grid regions by using a space or structure of the distribution network    S1

Obtain different topology structures and a power loss value corresponding to each topology structure by applying the multi-stage reconfiguration method based on the improved optimal flow pattern method and the branch exchange method to each grid region    S2

Determine whether each topology structure and the power loss value corresponding to each topology structure satisfy a preset condition of a distribution network reconfiguration model, where the preset condition includes a target function aimed at minimizing power loss and inherent constraints; and in response to a power loss value corresponding to a topology structure satisfying the preset condition, store the corresponding topology structure for each grid region    S3

Input the topology structure satisfying the preset condition for each divided grid region into a graph computing library, perform iterative training for graph computing by using a synchronous alternating direction method of multipliers until a reconfiguration process for switches in all grid regions of the distribution network is completed, and output a result of the multi-stage topology reconfiguration of the distribution network    S4

FIG. 1B

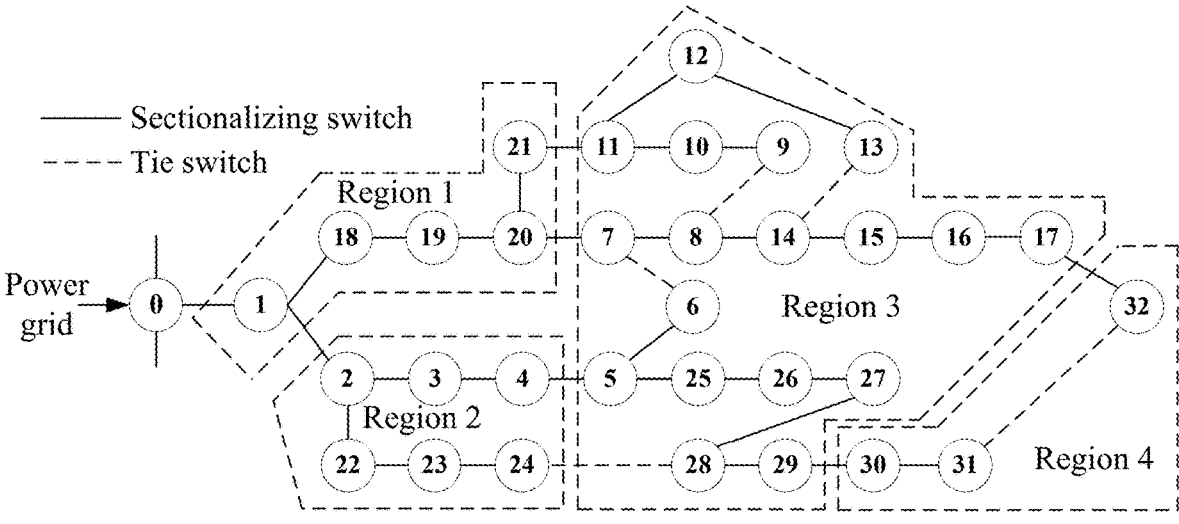

FIG. 2

Start

↓

Collect data: Each vertex (node) reads data from adjacent edges (branches)

↓

Update data: Each vertex updates its status value independently

↓

Transmit data: Each vertex transmits a new status value to adjacent edges

↓

End

| Partitioning module | Topology structure setting module | Graph computing determination module | Multi-stage reconfiguration module |
|---|---|---|---|

METHOD AND SYSTEM FOR MULTI-STAGE TOPOLOGY RECONFIGURATION OF DISTRIBUTION NETWORK BASED ON GRAPH COMPUTING

CROSS-REFERENCE TO RELATED APPLICATIONS

This is a continuation of International Patent Application No. PCT/CN2025/090377, filed on Apr. 22, 2025, which claims priority to Chinese Patent Application No. 202410985204.9 filed with the China National Intellectual Property Administration (CNIPA) on Jul. 23, 2024, the disclosures of which are incorporated herein by reference in their entireties.

TECHNICAL FIELD

This application relates to the technical field of energy storage in distribution networks, for example, to a method for multi-stage topology reconfiguration of a distribution network based on graph computing and a system for multi-stage topology reconfiguration of a distribution network based on graph computing.

BACKGROUND

The distribution network is one of the fundamental components of the power grid. It involves all aspects of user electricity consumption, featuring a vast and complex structure. The operational quality of the distribution network directly affects the quality of electricity supply to users. The primary function of the distribution network is to transmit electrical energy from generators at nodes and the upper-level grid at the root node to other load nodes. However, as the number of branches and nodes in the distribution network increases, the system scale expands, and computations become increasingly complex. Traditional centralized computing has poor scalability and high communication costs, making it difficult to meet the computational demands of distribution networks.

In the field of distribution network research, since the impedance of branches is significantly greater than resistance, reducing network losses has always been a critical issue to address. Distribution network reconfiguration, by altering the network topology, that is, by changing the open and closed states of sectionalizing switches and tie switches between nodes, transfers load nodes and reduces power losses.

Current research on distribution network reconfiguration primarily focuses on three methods, that is, a mathematical optimization method, a heuristic method, and an intelligent optimization algorithm. Although mathematical optimization can quickly find an optimal solution, it is not directly applicable to non-convex nonlinear problems and is overly dependent on initial values. The heuristic method is simple and capable of high-quality searches for optimal solutions, but as the number of nodes increases, the workload grows and computational efficiency decreases. The intelligent optimization algorithm, while effective for small-scale systems, struggles to converge to optimal solutions in large-scale node systems. Additionally, with rising communication costs and growing user demands for privacy, efficiently and securely reducing network losses is a significant challenge for distribution network reconfiguration.

For example, Chinese Patent Application No. 202310097347.1 discloses a distributed photovoltaic capacity allocation method considering distribution network reconfiguration, which uses a Cuckoo Search Algorithm to achieve a more reasonable capacity configuration of the distribution network and employs the optimal flow pattern method for reconfiguration. Chinese Patent Application No. 202111106696.2 discloses a method for fault handling and network reconfiguration suitable for a distribution network with strong uncertainty, which achieves optimized post-fault network reconfiguration through the branch exchange method. However, these methods have the following shortcomings: (1) As the number of nodes increases, the workload becomes excessive, and computational efficiency decreases. (2) These methods cannot accurately and effectively perform distribution network reconfiguration and are influenced by the original topology structure. Specifically, the optimal flow pattern method has a slow solving speed and struggles to search for the global optimum due to mutual current influence. The branch exchange method leads to a high workload and low computational efficiency as the number of nodes grows, and the power flow calculations are affected by non-independent topologies. (3) During distribution network reconfiguration, these methods cannot securely protect user information while effectively reducing network losses.

SUMMARY

This application provides a method for multi-stage topology reconfiguration of a distribution network based on graph computing and a system for multi-stage topology reconfiguration of a distribution network based on graph computing.

In a first aspect, this application provides a method for multi-stage topology reconfiguration of a distribution network based on graph computing. The method includes the steps below.

A to-be-reconfigured distribution network is divided into multiple grid regions by using a space or structure of the distribution network.

Different topology structures and a power loss value corresponding to each topology structure are obtained by applying a multi-stage reconfiguration method based on an improved optimal flow pattern method and a branch exchange method to each grid region.

It is determined whether each topology structure and the power loss value corresponding to each topology structure satisfy a preset condition of a distribution network reconfiguration model, where the preset condition includes a target function aimed at minimizing power loss and inherent constraints; and in response to a power loss value corresponding to a topology structure satisfying the preset conditions, the corresponding topology structure for each grid region is stored.

The topology structure for each divided grid region satisfying the preset condition is input into a graph computing library, iterative training is performed for graph computing by using a synchronous alternating direction method of multipliers until a reconfiguration process for switches in all the grid regions of the distribution network is completed, and a result of the multi-stage topology reconfiguration of the distribution network is output.

The multi-stage reconfiguration method based on the improved optimal flow pattern method and the branch exchange method includes the following:

All switches in an initial topology of the distribution network are closed to form a ring-shaped loop topology structure.

The number of iterations is set to the number of branches in the ring-shaped loop topology structure, in each iteration, switches in the ring-shaped loop topology structure are sequentially opened, power loss values are calculated in a parallel distributed manner, a switch with the minimum power loss value is selected as a tie switch, and after the iterations are completed, all obtained tie switches are opened to acquire a radial network topology.

State transitions are performed on sectionalizing switches and tie switches of the acquired radial network topology by using a switch pre-classification method to acquire a topology structure and a power loss value for each state transition, and an optimal topology structure and a power loss value are acquired through parallel distributed computing.

In another aspect, this application provides a system for multi-stage topology reconfiguration of a distribution network based on graph computing. The system includes a partitioning module, a topology structure setting module, a graph computing determination module, and a multi-stage reconfiguration module.

The partitioning module is configured to divide a to-be-reconfigured distribution network into multiple grid regions by using a space or structure of the distribution network.

The topology structure setting module is configured to obtain different topology structures and a power loss value corresponding to each topology structure by applying a multi-stage reconfiguration unit based on an improved optimal flow pattern method and a branch exchange method to each grid region.

The graph computing determination module is configured to determine whether each topology structure and the power loss value corresponding to each topology structure satisfy a preset condition of a distribution network reconfiguration model, where the preset condition includes a target function aimed at minimizing power loss and inherent constraints; and in response to a power loss value corresponding to a topology structure satisfying the preset condition, store the topology structure for each grid region.

The multi-stage reconfiguration module is configured to input the topology structure for each divided grid region satisfying the preset condition into a graph computing library, perform iterative training for graph computing by using a synchronous alternating direction method of multipliers until a reconfiguration process for switches in all grid regions of the distribution network is completed, and output a result of the multi-stage topology reconfiguration of the distribution network.

The multi-stage reconfiguration unit based on the improved optimal flow pattern method and the branch exchange method includes a loop topology structure section, a graph computing iteration section, and a graph computing state transition section.

The loop topology structure section is configured to close all switches in an initial topology of the distribution network to form a ring-shaped loop topology structure.

The graph computing iteration section is configured to set the number of iterations to the number of branches in the ring-shaped loop topology structure, sequentially open switches in the ring-shaped loop topology structure during each iteration, calculate power loss values in a parallel distributed manner, select a switch with the minimum power loss value as a tie switch, and open all obtained tie switches to acquire a radial network topology after the iterations are completed.

The graph computing state transition section is configured to perform state transitions on sectionalizing switches and tie switches of the acquired radial network topology by using a switch pre-classification method to obtain a topology structure and a power loss value for each state transition, and acquire an optimal topology structure and a power loss value through parallel distributed computing.

BRIEF DESCRIPTION OF DRAWINGS

FIG. 1A is a flowchart illustrating a technique for multi-stage topology reconfiguration of a distribution network based on graph computing according to an exemplary embodiment.

FIG. 1B is a flowchart illustrating a method for multi-stage topology reconfiguration of a distribution network based on graph computing according to an exemplary embodiment.

FIG. 2 is a schematic diagram illustrating the structure of a distribution network according to an exemplary embodiment.

DETAILED DESCRIPTION

Figure 3:
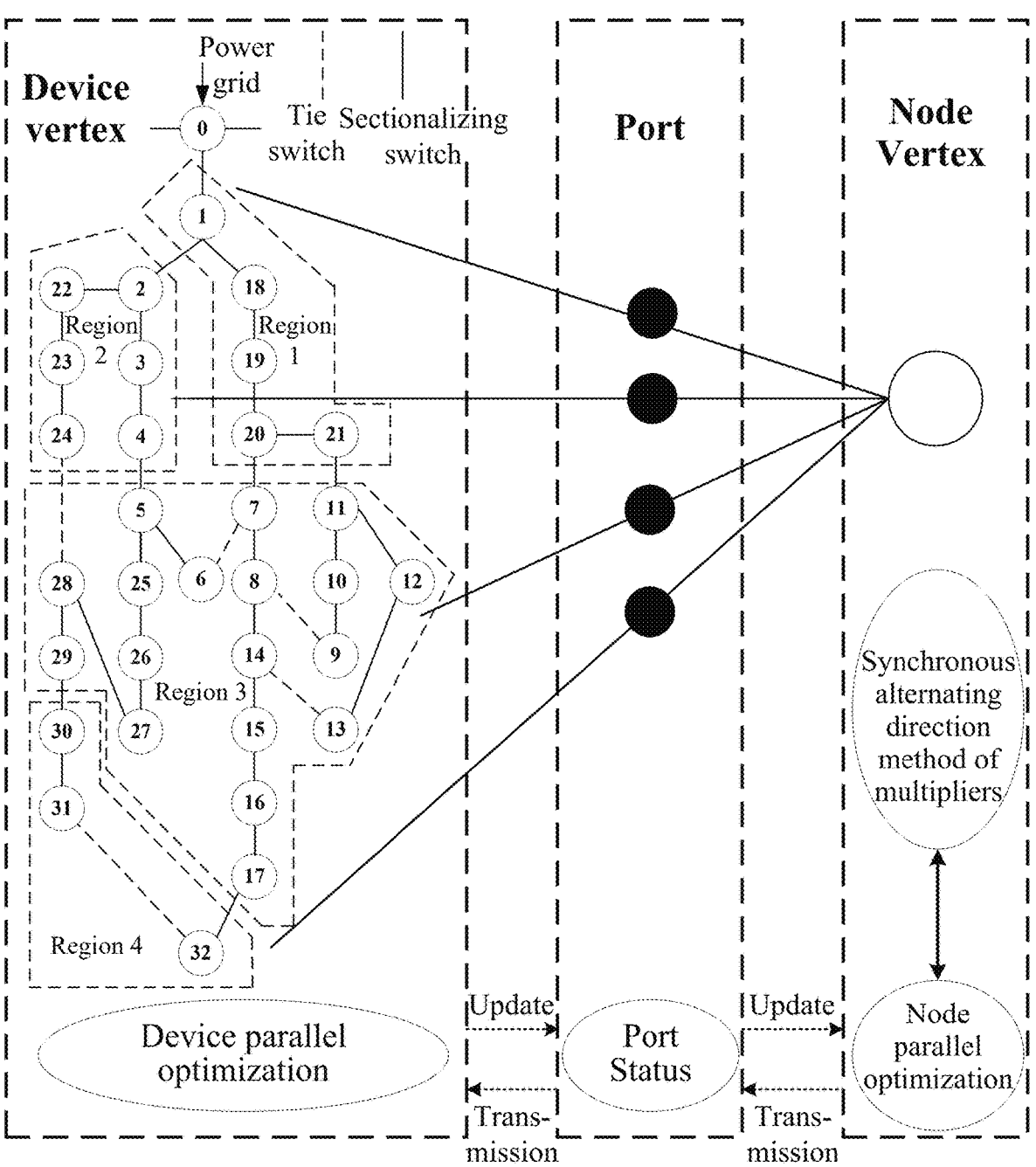
FIG. 3 is a schematic diagram illustrating a distribution network based on principles of graph computing according to an exemplary embodiment.

Solutions in the embodiments of this application will be described in conjunction with the drawings in the embodiments of this application. The embodiments described below are part, not all, of the embodiments of this application. Based on the embodiments of this application, all other embodiments obtained by those of ordinary skill in the art without creative work are within the scope of this application.

(1) Optimal Flow Pattern Method

The optimal flow pattern method assumes that the distribution network consists of pure resistance, with injected currents representing the load at each node. Thus, the relationship between the node voltage matrix U and the node current matrix I is that U=I/Y, where Y denotes the node admittance matrix. Then, the network loss calculation formula for the distribution network is as follows:

$$P_{Loss} = \sum_{i=1}^{n} v_i i_i = \sum_{i=1}^{n-1} V_i i_i = \sum_{i=1}^{n} (v_i - v_n) i_i = U^T I^* = I^{*T} Usd \tag{7}$$

In the formula, $v_i$ and $i_i$ denote the voltage and current of a node i, respectively, $v_n$ denotes the voltage of a node n, and n denotes the number of nodes in the distribution network.

In this application, by changing the switch states of nodes i and j in the original network $N_0$, the switches of nodes i and j are opened. Assuming the conductance of the branch is $g_{ij}$, and other conductances are $\Delta g_{ij}$, the optimal flow pattern method indicates that opening a switch between nodes is equivalent to paralleling a conductance $-g_{ij}$, thereby forming a new power network N.

Therefore, the change in power loss before and after opening and closing a switch may be expressed as follows:

$$\Delta P_{Loss} = P_{Loss\_N} - P_{Loss} = \left|I_{ijN_0}\right|^2 (R_{ij} + \Delta R_{ij}) \tag{8}$$

The optimal flow pattern method has good convergence in distribution network reconfiguration, but has a slow solution speed and struggles to find an optimal solution due to mutual current influences.

(2) Branch Exchange Method

The branch exchange method involves changing the states of tie switches and sectionalizing switches to transfer load demands to other nodes, thereby reducing power losses. Each opening and closing of a tie switch results in a change in active power loss. The line voltage in the distribution network generally changes slightly, and reactive power flow can be neglected.

$$\Delta P_{Loss} = 2 \times \left[\left(\sum_{i \in D} I_i\right) \times (V_m - V_n)\right] + R_{mn}\left(\left|\sum_{i \in D} I_i\right|\right)^2 \tag{9}$$

The branch exchange method increases feasible solutions in distribution network reconfiguration, but reduces convergence speed, and the power flow calculations are affected by non-independent topologies.

Therefore, based on the above, this application proposes a multi-stage distribution network reconfiguration technique, which can achieve accurate and effective opening and closing of sectionalizing switches and tie switches; meanwhile, by taking the computational complexity of the process into consideration, distribution network regions are aggregated, fundamental principles of graph computing are introduced, parallel computation of optimal power losses across multiple regional grids is performed, so that user privacy can be protected, thereby achieving optimal distribution network reconfiguration. That is, (3) Multi-Stage Distribution Network Reconfiguration Based on an Optimal Flow Pattern Method and a Branch Exchange Method The embodiments of this application provide a multi-stage topology reconfiguration technique for a distribution network based on graph computing, which can effectively reduce power losses and minimize costs. By adopting principles of graph computing, solving efficiency is significantly improved. The proposed reconfiguration technique in this application can further mitigate the impact of ring network current and place fewer constraints on the initial network topology while enhancing solution efficiency and ensuring user privacy. On this basis, the overall costs of the distribution network are reduced, providing a solution to alleviate power losses of the distribution network.

To address issues such as mutual current influences in the loop network and the susceptibility of nodes to an islanding effect in the optimal flow pattern method, as well as the impact of non-independent topologies on power flow calculations in the branch exchange method, this application proposes a multi-stage distribution network reconfiguration method based on the optimal flow pattern method and the branch exchange method.

In S100, an initial optimal solution for optimal power loss is acquired. All switches in the initial topology of the distribution network are closed to form a ring-shaped loop topology structure, and the number of iterations is set to the number of branches in the ring-shaped loop topology structure. In each iteration, switches in the ring-shaped loop topology structure are sequentially opened, power losses are calculated, and a switch with the minimum power loss is selected as a tie switch. After iterations are completed, all obtained tie switches are opened to acquire a radial network topology.

In S200, the obtained radial network topology is further optimized by converting sectionalizing switches to tie switches, new radial network topologies are acquired by using S100, and power losses of different radial network topologies are acquired, thereby acquiring an optimal reconfiguration solution.

To improve solving efficiency, a switch pre-classification method is applied in S200 to exclude the following types of sectionalizing switches:

Type I refers to sectionalizing switches to which the shortest path from a node to the substation node in the initial network topology consists of $n_1$ or fewer than $n_1$ sectionalizing switches belong.

Type II refers to sectionalizing switches to which the shortest path from a node to the substation node in the initial network topology consists of $n_2$ or fewer than $n_2$ sectionalizing switches belong.

Type III refers to sectionalizing switches that are not in a closed switch loop.

Since the state of type I between a node and the substation node is relatively easy to determine, sectionalizing switches of type I may be excluded in advance. To avoid the islanding effect, the state of sectionalizing switches of type II remains unchanged, and the state of sectionalizing switches of type III also remains unchanged.

In S300, after switch pre-classification in S200, sectionalizing switches excluding sectionalizing switches of types I, II, and III are opened in S100 to obtain an optimal topology and the minimum power loss. Then, sectionalizing switches of type II are included, and a simultaneous open-close method is applied in this application, that is, for each type-II sectionalizing switch opened, a tie switch is closed simultaneously.

As shown in FIG. 1A, the multi-stage topology reconfiguration method for a distribution network in this embodiment includes S110 to S140.

In S110, a method for distribution network reconfiguration based on the optimal flow pattern method and the branch exchange method is provided.

In S120, a multi-stage reconfiguration model for the distribution network with an optimal power loss model is constructed.

In S130, a multi-stage reconfiguration calculation method for the distribution network based on graph computing is provided.

In S140, the optimal power loss model is solved to obtain the distribution network reconfiguration technique.

As shown in FIG. 1B, as a possible implementation of this embodiment, a method for multi-stage topology reconfiguration of a distribution network based on graph computing is provided. The method includes S1 to S4.

In S1, a to-be-reconfigured distribution network is divided into multiple grid regions by using the space or structure of the distribution network.

To improve the efficiency of distribution network reconfiguration, the distribution network reconfiguration in this application is performed after dividing the to-be-reconfigured distribution network into multiple grid regions by using indicators such as the space or structure of the distribution network.

In S2, different topology structures and a power loss value corresponding to each topology structure are obtained by applying the multi-stage reconfiguration method based on an improved optimal flow pattern method and the branch exchange method to each grid region.

The multi-stage reconfiguration method based on the improved optimal flow pattern method and the branch exchange method includes S21 to S23.

In S21, all switches in an initial topology of the distribution network are closed to form a ring-shaped loop topology structure.

In S22, the number of iterations is set to the number of branches in the ring-shaped loop topology structure, in each iteration, switches in the ring-shaped loop topology structure are sequentially opened, power loss values are calculated in a parallel distributed manner, a switch with the minimum power loss value is selected as a tie switch, and after the iterations are completed, all obtained tie switches are opened to acquire a radial network topology.

In S23, state transitions of sectionalizing switches and tie switches are performed on the acquired radial network topology by using the switch pre-classification method, a topology structure and a power loss value for each state transition are acquired, and an optimal topology structure and a power loss value are acquired through parallel distributed computing.

In an embodiment, the step S22 includes S221 to S224.

In S221, a ring-shaped loop topology structure corresponding to the current grid region is input, all K switches are identified, and the current switch k is initialized.

In S222, a k-th switch in the ring-shaped loop topology structure is opened, a power loss value is calculated, and it is determined whether each node in the ring-shaped loop topology structure has a path to a substation and satisfies the inherent constraints; in response to each node having the path to the substation and satisfying the inherent constraints, step S223 is performed; and if a node lacking a path to the substation or failing to satisfy the inherent constraints exists, the value of the target function is set to a large positive number $(10^9)$.

In S223, the current power loss value is stored, and a $(k+1)$-th switch is opened.

In S224, it is determined whether k is greater than K; in response to k being greater than K, a switch with the minimum power loss value is identified as a tie switch; when the number of iterations reaches the number of branches in the ring-shaped loop topology structure, all obtained tie switches are set to an open state to form the radial network topology; in response to k not being greater than K, step S222 is performed.

In an embodiment, the step S23 includes S231 to S237.

In S231, the ring-shaped loop topology structure is input, all sectionalizing switches are converted to tie switches, and the latest topology structure is acquired by applying the multi-stage reconfiguration method based on the improved optimal flow pattern method and the branch exchange method. Moreover, sectionalizing switches other than sectionalizing switches of types I to III in the current topology structure are recorded as a set $\Omega_1$, and sectionalizing switches of type II are recorded as a set $\Omega_2$; where type I refers to a sectionalizing switch to which the shortest path from the current node to a substation node in the ring-shaped loop topology structure consists of $n_1$ or fewer than $n_1$ sectionalizing switches belongs; type II refers to a sectionalizing switch to which the shortest path from the current node to a substation node in the ring-shaped loop topology structure consists of $n_2$ or fewer than $n_2$ sectionalizing switches belongs; and type III refers to a sectionalizing switch that is not in a closed switch loop.

In S232, for sectionalizing switches outside the set QI, one sectionalizing switch is sequentially opened at a time, all the other switches are closed, the step S22 is performed, the one sectionalizing switch remains open until the radial network topology is formed, and the radial network topology and the corresponding power loss value are stored.

In S233, an open-close action is performed on sectionalizing switches in the set $\Omega_2$, and the open-close action includes opening one sectionalizing switch of type II and simultaneously closing one tie switch to maintain connectivity. For example, as shown in FIG. 2, when the switch between nodes 5 and 6 is opened, the tie switch 6-7 is closed to ensure connectivity.

In S234, an available open-close action is executed, a power loss optimization function is solved, a topology structure and a power loss value after the open-close action are recorded, and it is determined whether the open-close action reduces power loss; in response to a reduction in power loss, the topology structure and the corresponding power loss value obtained after the open-close action are stored.

In S235, the step S234 is performed for all sectionalizing switches in the set $n_2$.

In S236, different topology structures obtained after executing different open-close actions and a power loss value corresponding to each topology structure are stored, and opened sectionalizing switches are closed.

In S237, steps S232 to S236 are repeated for the sectionalizing switches in the ring-shaped loop topology structure.

In S3, it is determined whether each topology structure and the power loss value corresponding to each topology structure satisfy a preset condition of a distribution network reconfiguration model, where the preset condition includes a target function aimed at minimizing power loss and inherent constraints; in response to the preset condition not being satisfied, the corresponding topology structure is not considered; in response to the preset condition being satisfied, the topology structure for each grid region is stored.

As a possible implementation of this embodiment, the process of constructing the multi-stage reconfiguration model for the distribution network with an optimal power loss model is as follows:

The safe and economical operation of the distribution network is related to many parameters, and the network loss of the distribution network accounts for a large proportion of the network loss of the entire power system. To this end, this application constructs a target function aimed at minimizing power loss.

$$C = \min \sum_{n=1}^{N} f(x_n) = \min \sum_{i=1, j=1}^{N} \left( \frac{p_{ij} + q_{ij}}{v_j} \right)^2 r_{ij} \ \forall i, \forall j \in N \tag{10}$$

In the formula, $p_{ij}$, $q_{ij}$, and $r_{ij}$ denote an active power between a node i and a node j, a reactive power between the node i and the node j, and a branch resistance between the node i and the node j, respectively, and $v_j$ and N denote a voltage of the node j and a number of load nodes, respectively.

To ensure the safe and stable operation of the distribution network, certain inherent constraints need to be satisfied, mainly including equality constraints and inequality constraints.

(1) Power Flow Constraints $$\begin{cases} p_{demand,i} + \sum_{i,j \in \Omega_b} v_i v_j (G_{ij}\cos\theta_{ij} + B_{ij}\sin\theta_{ij}) = 0 & (11a) \\ q_{demand,i} + \sum_{i,j \in \Omega_b} v_i v_j (G_{ij}\sin\theta_{ij} - B_{ij}\cos\theta_{ij}) = 0 & (11b) \\ (v_i v_j)^2 \left[ (G_{ij}\cos\theta_{ij} + B_{ij}\sin\theta_{ij})^2 + (G_{ij}\sin\theta_{ij} - B_{ij}\cos\theta_{ij})^2 \right] \leq \overline{S_{ij}}^2 & (11c) \end{cases}$$

In the formulas, formula (11a) represents an active power balance of a node, which is a prerequisite for maintaining frequency stability in the distribution network; $p_{demand,i}$ and $v_i$ denote active power of a node i and a voltage of the node i, respectively, $G_{ij}$ and $B_{ij}$ denote a real part and an imaginary part of the admittance matrix at an $i^{th}$ row and a $j^{th}$ column, respectively, and $\Omega_b$ denotes a set of all branches. Formula (IIb) represents a reactive power balance of the node, which is a prerequisite for maintaining voltage stability in the distribution network; and $q_{demand,i}$ denotes reactive power of the node i. Formula (IIc) represents the maximum transmission capacity limit between the node i and the node j, and Sy denotes the maximum apparent power.

(2) Distribution Network Current Constraints, Voltage Constraints, and Micro-Turbine Constraints $$\begin{cases} v_{i,min} \leq v_i \leq v_{i,max} & (12a) \\ I_{ij,min} \leq I_{ij} \leq I_{ij,max} & (12b) \\ P_{g(i),min} \leq P_{g(i)} \leq P_{g(i),max} & (12c) \\ q_{g(i),min} \leq q_{g(i)} \leq q_{g(i),max} & (12d) \end{cases}$$

In the formulas, (12a) represents a voltage constraint of the distribution network, ensuring the safe operation of the distribution network and electrical equipment; $v_i$ denotes a voltage of the node i, and $v_{i,max}$ and $v_{i,min}$ denote an upper voltage limit of the node i and a lower voltage limit of the node i, respectively. (12b) represents a branch current constraint from the node i to the node j, ensuring line safety; $I_{ij}$ denotes a branch current from the node i to the node j, and $I_{ij,min}$ and $I_{ij,max}$ denote an upper current limit of a branch and a lower current limit of the branch, respectively. (12c) represents an active power output constraint of a micro-turbine, $p_{g(i)}$ denotes active power of the micro-turbine at the node i, and $p_{g(i),max}$ and $p_{g(i),min}$ denote an upper active power limit of the micro-turbine at the node i and a lower active power limit of the micro-turbine at the node i, respectively. (12d) represents a reactive power output constraint of the micro-turbine, $q_{g(i)}$ denotes a reactive power of the micro-turbine at the node i, and $q_{g(i),max}$ and $q_{g(i),min}$ denote an upper reactive power limit of the micro-turbine at the node i and a lower reactive power limit of the micro-turbine at the node i, respectively.

(3) Distribution Network Topology Constraints

During the process of the distribution network reconfiguration, radiality and connectivity constraints need to be satisfied, and the radiality and connectivity constraints are expressed as follows:

$$\begin{cases} N - n_b = 1 & (13a) \\ dis(i, i_{ge}) < \infty(i \neq i_{ge}) & (13b) \end{cases}$$

In the formulas, $n_b$ denotes the number of branches, and $dis(i, i_{ge})$ denotes the distance from node i to a substation node $i_{ge}$.

In S4, the corresponding topology structure in each grid region is iteratively calculated using a graph computing method, and when the convergence conditions for parallel distributed computing are satisfied, the distribution network reconfiguration is ended; alternatively, a topology structure satisfying the preset condition for each divided grid region is input into a graph computing library, iterative training is performed for graph computing by using a synchronous alternating direction method of multipliers until a reconfiguration process of switches in all grid regions of the distribution network is completed, and a result of the multi-stage topology reconfiguration of the distribution network is output.

As a possible implementation of this embodiment, this application introduces graph computing for distribution network reconfiguration calculations. Graph computing utilizes the principles of graph theory to describe the nodes and edges of the distribution network in a matrix form. Nodes are connected through edges, and communication information is exchanged through the edges.

Figures 6, 7, 8:
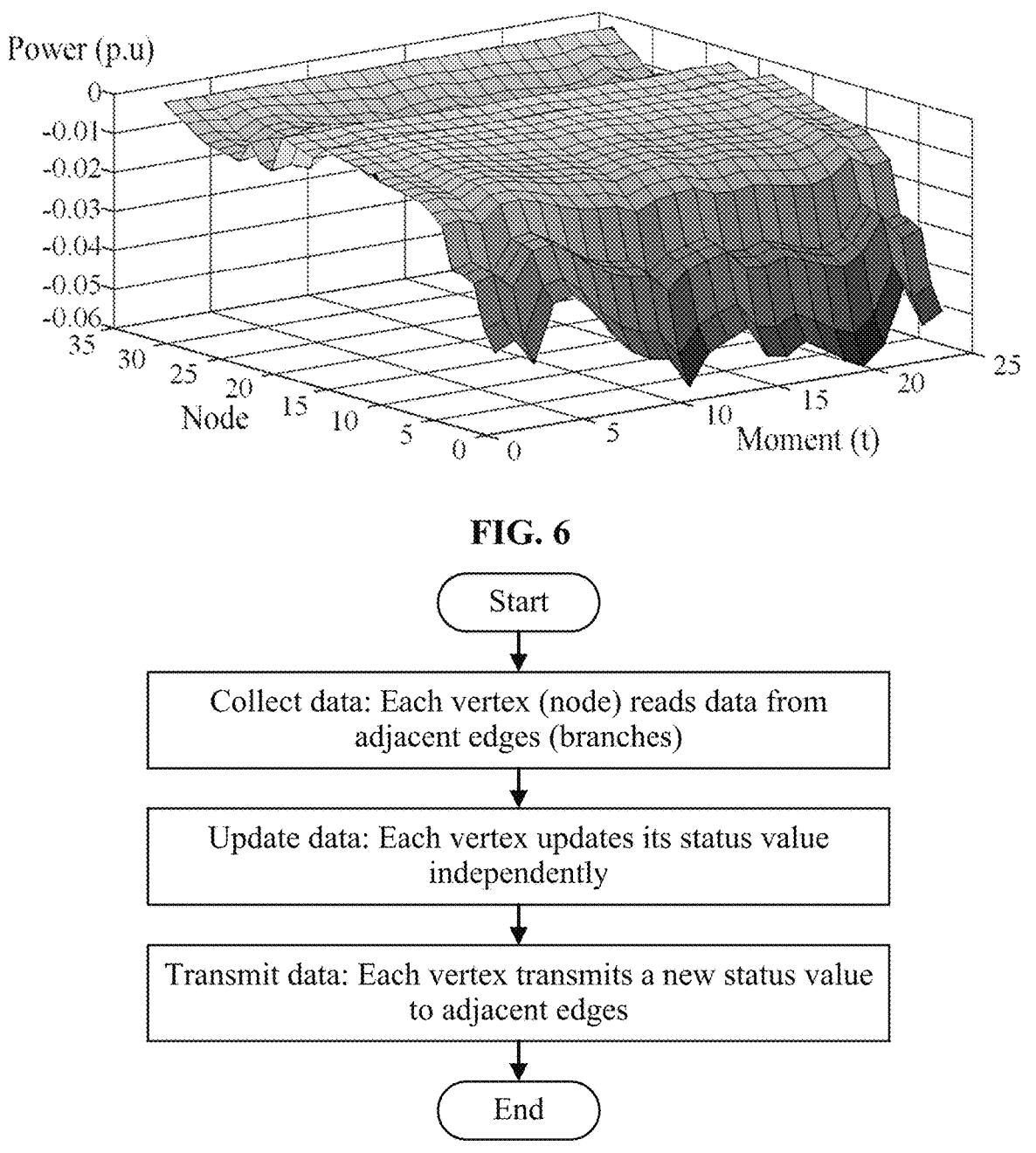
FIG. 6 is a schematic diagram illustrating power at multiple nodes of a distribution network according to an exemplary embodiment.
FIG. 7 is a schematic diagram illustrating a process based on graph computing according to an exemplary embodiment.
FIG. 8 is a schematic diagram illustrating a system for multi-stage topology reconfiguration of a distribution network based on graph computing according to an exemplary embodiment.

The distribution network consists of nodes and branches, and multiple nodes are connected by branches to transmit information. The nodes and branches of the distribution network may form the basic concepts of graph computing. By using the basic principles of graph computing, the structure of the distribution network is transformed into graph relationships, multiple nodes are set as vertices, and optimization data are stored in a graph database for parallel computing to improve computational efficiency. Each vertex is configured to perform optimal parallel optimization calculations for distribution network power losses based on information transmitted from adjacent vertices and update boundary information based on optimization results, as shown in FIG. 7.

In this application, a graph computing method for distribution network reconfiguration based on graph theory is derived, and the power loss of distribution network reconfiguration in a compact form is expressed as follows:

$$\begin{cases} \min f(x_n) & (14) \\ \text{s.t.}(11)\sim(13) \end{cases}$$

In the formula, $f$ is a target function expression, and $x_n$ denotes a decision variable for an n-th grid region.

The alternating direction method of multipliers is introduced into graph computing, and a graph computing method for distribution network reconfiguration based on the alternating direction method of multipliers is derived.

An auxiliary function is defined, that is, a node indicator function is defined.

$$h(z_n) = \begin{cases} 0 & z_n \in \Omega_1 \\ +\infty & z_n \notin \Omega_1 \end{cases} \quad (15)$$

In the formula, $z_n$ denotes a state vector of node n.

By using the alternating direction method of multipliers, formula (13) is transformed into the following:

$$\left\{ \begin{array}{c} \sum_{n=1}^{N} f(x_n) + \sum_{n=1}^{N} h(z_n) \\ \text{s.t. } x_n = z_n \end{array} \right. \tag{16}$$

Then formula (15) is transformed into a Lagrangian function.

$$\left\{ \begin{array}{l} x_{k+1} = \arg \min L(x, z_k, w_k) \\ z_{k+1} = \arg \min L(x_{k+1}, z, w_k) \\ w_{k+1} = w_k + \rho(x_{k+1} - z_{k+1}) \end{array} \right.$$

In the formula that $w=l/\rho$, $l$ and $\rho$ denote a Lagrangian multiplier and a penalty factor, respectively.

Distributed computing is performed on optimized data in a graph database, and the synchronous alternating direction method of multipliers is introduced into the distribution network reconfiguration. Formula (16) is transformed into the following:

$$\left\{ \begin{array}{ll} x_n^{k+1} = \text{argmin}_{x_n} f(x_n) + \frac{\rho}{2} \left\| x_n^{ex} - z_n + w_n^k \right\|_2^2 & (18a) \\ x_n^{k+1} = \text{argmin}_{x_n} f(x_n) + \frac{\rho}{2} \left\| x_n^{ex} - z_n + w_n^k \right\|_2^2 & (18b) \\ w_n^{k+1} = w_n^k + x_n^{ex,k+1} - z_n^{k+1} & (18c) \end{array} \right.$$

In the formulas, $$x_n^{ex}$$

denotes exchanged power of an n-th grid region, and $$x_n^{ex,k}$$

denotes exchanged power of the n-th grid region at a k-th iteration.

According to the definition of a function $h(z_n)$, the final iterative form of the synchronous alternating direction method of multipliers is expressed as follows:

$$\left\{ \begin{array}{ll} x_n^{k+1} = \arg \min_{x_n} \{ f(x_n) \} + \frac{\tau}{2} \left\| x_n^{ex} - x_n^{ex,k} + \overline{x}^{ex,k} + w^k \right\|_2^2 \} & (19a) \\ w^{k+1} = w^k + \overline{x}^{ex,k+1} & (19b) \end{array} \right.$$

In the formulas, $\overline{x}^{ex,k}$ denotes the average exchanged power at the k-th iteration.

To establish fully-distributed graph computing, graph theory is introduced. In this application, nodes in the distribution network are described as an undirected graph, each node in the distribution network is a point of the undirected graph, and branches are edges. Thus, the Laplacian matrix of the distribution network is described as follows:

$$L_{ij} = L_1 - L_2 = \left\{ \begin{array}{ll} |D_i| & i = j \\ -1 & i \neq j \end{array} \right. \tag{20}$$

In the formula, $L_1$ and $L_2$ denote the adjacency matrix and degree matrix, respectively; $D_i$ and $|D_i|$ denote the set of nodes connected to the node i and the number of nodes in the set, respectively.

Based on the principles of discrete consensus theory, in response to a Laplacian matrix having L non-zero eigenvalues, the average value of power exchange of a node after L iterations is obtained.

$$\left\{ \begin{array}{ll} \overline{x}_i^{ex} & = x_i(L) + \frac{1}{N} \sum_{i=1}^{N} x_i(L) & (21a) \\ x_i(d+1) & = s_{ii}(d)x_i(d) + \sum_{j \in D_i} x_{ij}(d)x_j(d) & (21b) \\ s_{ii}(d) & = 1 - \frac{|D_i|}{\vartheta_{d+1}} i = j, d = 1, 2, \dots, L & (21c) \\ s_{ij}(d) & = \frac{1}{\vartheta_{d+1}} j \in D_i, d = 1, 2, \dots, K & (21d) \end{array} \right.$$

In the formulas, $x_i(L)$ denotes the updated value of the node i after the L-th iteration; $s_{ii}(d)$ and $s_{ij}(d)$ are the weight factors at a d-th iteration, and $1_{d+1}$ denotes a (d+1)-th non-zero eigenvalue of the Laplacian matrix.

In an example, the residual that $$\varsigma^{k+1} = \left\| x_n^{k+1} - x_n^k \right\|_2^2 \leq \varsigma_{min}$$

is defined at a (k+1)-th iteration, and when all the grid regions of the distribution network converge, the distribution network converges, and the result of the multi-stage topology reconfiguration of the distribution network is output.

In summary, the multi-stage topology reconfiguration model for the distribution network based on graph computing proposed in this application consists of equations (11) to (21). By solving this mathematical model, the economic operation of the distribution network can be ensured while the safety of the distribution network is improved. Additionally, since the distribution network reconfiguration technique proposed by this application is based on graph computing, and graph computing is a novel parallel computing method, the computational efficiency can be enhanced, user privacy can be protected, and communication costs can be reduced.

In this embodiment, the process of obtaining the distribution network reconfiguration technique involves solving the optimal power loss model using a Gurobi solver, with a solution tolerance of 0.01%.

An example is used to illustrate the method for multi-stage topology reconfiguration of a distribution network based on graph computing proposed in this application. FIG. 2 is a schematic diagram of the Institute of Electrical and Electronics Engineers (IEEE) 33-node structure of a distribution network, including 33 nodes and 37 branches. 5 branches are tie switches, and the rest are sectionalizing switches. The distribution network is divided into multiple grid regions by using indicators such as the space or structure of the distribution network. The reference voltage is 12.66 kV, and the upper and lower voltage limits are set to 1.06 p.u. and 0.94 p.u., respectively. The cost coefficients of micro-turbine power generation are described in Table 1, where a, b, and c are the micro-turbine cost coefficients inherent to the IEEE nodes. Additionally, based on the principles of graph computing, graph theory is introduced to transform the IEEE 33-node structure into a graph computing schematic, as shown in FIG. 3.

TABLE 1

| Micro-turbine generation cost coefficients | | | |
| --- | --- | --- | --- |
| Generation Coefficient | a | b | c |
| Cost (Yuan/kWh$^2$) | 2 | 0 | 0 |

In the multi-stage topology reconfiguration method proposed by this application, the opening and closing of sectionalizing switches and tie switches are performed in three stages, and a new network topology structure and optimal power loss are obtained at each stage. Through simulation testing on the IEEE 33-node system, four different test scenarios are set up as follows:

Case 1: $N_0$ topology reconfiguration is considered.

Case 2: Only the first stage of multi-stage topology reconfiguration is considered (based on the optimal flow pattern method).

Case 3: Only the first and third stages of multi-stage topology reconfiguration are considered.

Case 4: The multi-stage topology reconfiguration method proposed by this application is considered.

The power losses in different scenarios are described in Table 2. As can be seen from Table 2, in the IEEE 33-node system, the power losses obtained in case 2 to case 4 are identical. This is because the first stage of the reconfiguration method in the IEEE 33-node system already acquires the optimal topology and the optimal power loss. The power loss without considering the distribution network reconfiguration method is 62.556% higher than that of the method proposed by this application.

TABLE 2

| Power loss in different scenarios | | | | |
| --- | --- | --- | --- | --- |
| Scenario | Case 1 | Case 2 | Case 3 | Case 4 |
| Power Loss (kW) | 140.545 | 52.625 | 52.625 | 52.625 |

Figure 5:
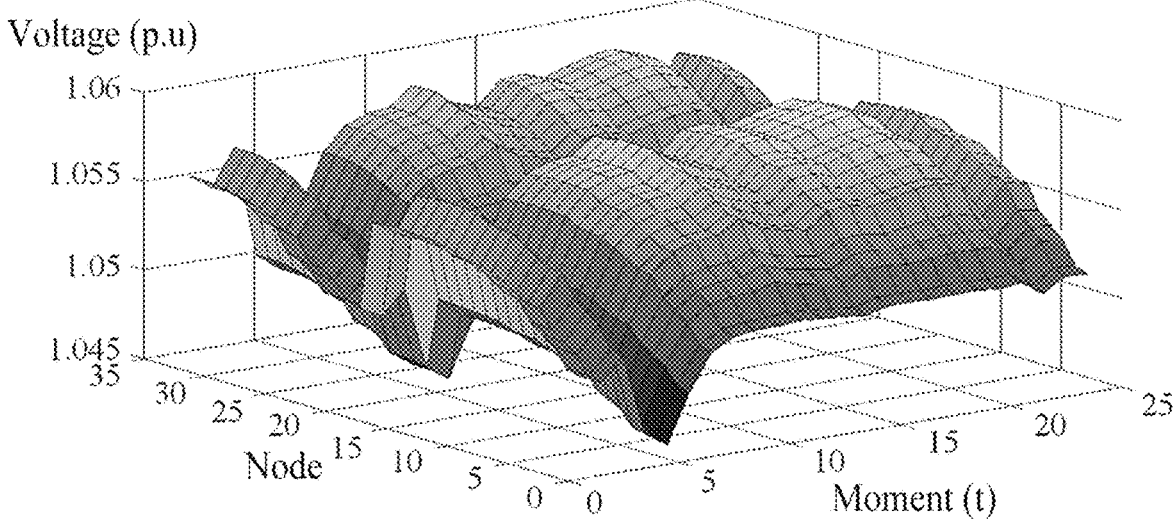
FIG. 5 is a schematic diagram illustrating voltages at multiple nodes of a distribution network according to an exemplary embodiment.

Additionally, the topology reconfiguration method in this application is performed under voltage constraints. As shown in FIG. 5, at each node and each moment, the distribution network reconfiguration method in this application satisfies the voltage constraints of 1.06 p.u. and 0.94 p.u. The active power obtained by this application is shown in FIG. 6.

Figure 4:
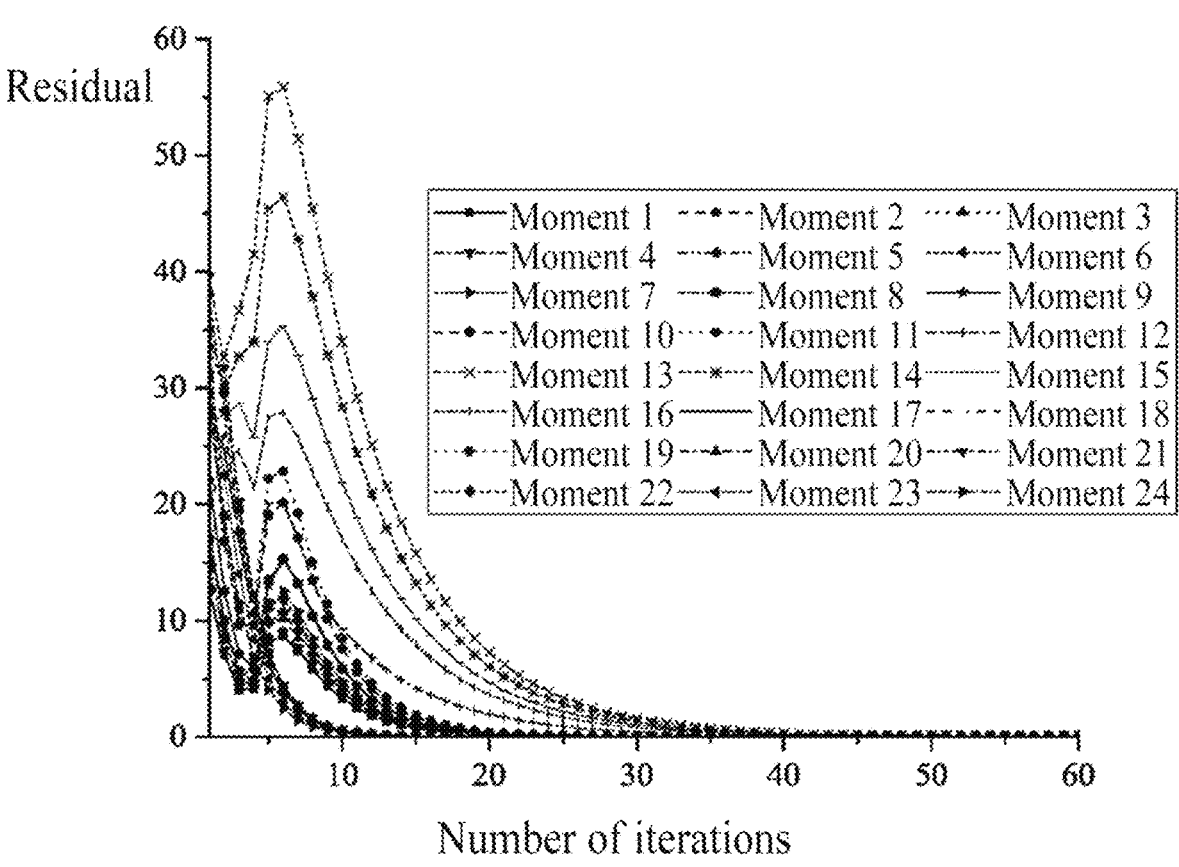
FIG. 4 is a schematic diagram illustrating convergence of an alternating direction method of multipliers based on graph computing according to an exemplary embodiment.

As shown in FIG. 4, the graph computing method based on the synchronous alternating direction method of multipliers proposed in this application can guarantee convergence within 40 iterations, demonstrates good convergence, and ensures the effectiveness of this application. The distribution network reconfiguration technique proposed in this application can accurately perform state transitions of sectionalizing switches and tie switches while ensuring optimal power loss and utilizes the principles of graph computing for distributed reconfiguration of the distribution network, thereby improving computational efficiency and ensuring the safety of distribution network voltages.

The multi-stage topology reconfiguration technique for the distribution network based on graph computing proposed in this application can reduce power losses. Additionally, this method extends the application of the distribution network reconfiguration technique in reducing power losses and may be applied to fields such as power systems to reduce power losses and improve supply reliability.

In another aspect, as shown in FIG. 8, this application also provides a system for multi-stage topology reconfiguration of a distribution network based on graph computing. The system includes a partitioning module, a topology structure setting module, a graph computing determination module, and a multi-stage reconfiguration module.

The partitioning module is configured to divide a to-be-reconfigured distribution network into multiple grid regions by using a space or structure of the distribution network.

The topology structure setting module is configured to obtain different topology structures and a power loss value corresponding to each topology structure by applying a multi-stage reconfiguration unit based on an improved optimal flow pattern method and a branch exchange method to each grid region.

The multi-stage reconfiguration unit based on the improved optimal flow pattern method and the branch exchange method includes a loop topology structure section, a graph computing iteration section, and a graph computing state transition section.

The loop topology structure section is configured to close all switches in an initial topology of the distribution network to form a ring-shaped loop topology structure.

The graph computing iteration section is configured to set the number of iterations to the number of branches in the ring-shaped loop topology structure, in each iteration, sequentially open switches in the ring-shaped loop topology structure, calculate power loss values in a parallel distributed manner, select the switch with the minimum power loss value as a tie switch, and after the iterations are completed, open all obtained tie switches to acquire a radial network topology.

The graph computing state transition section is configured to perform state transitions on sectionalizing switches and tie switches of the acquired radial network topology by using a switch pre-classification method to obtain a topology structure and a power loss value for each state transition, and acquire an optimal topology structure and a power loss value through parallel distributed computing.

The graph computing determination module is configured to determine whether each topology structure and the power loss value corresponding to each topology structure satisfy a preset condition of a distribution network reconfiguration model, where the preset condition includes a target function aimed at minimizing power loss and inherent constraints; in response to the preset condition not being satisfied, the corresponding topology structure is not considered; and in response to a power loss value corresponding to a topology structure satisfying the preset condition, the graph computing determination module is configured to store the corresponding topology structure for each grid region.

The graph computing iteration section is configured to perform step 2-1 to step 2-4.

In step 2-1, a ring-shaped loop topology structure corresponding to the current grid region is input, all K switches are identified, and the current switch k is initialized.

In step 2-2, a k-th switch in the ring-shaped loop topology structure is opened, a power loss value is calculated, and it is determined whether each node in the ring-shaped loop topology structure has a path to a substation and satisfies the inherent constraints; in response to each node having the path to the substation and satisfying the inherent constraints, step 2-3 is performed; and in response to a node lacking the path to the substation or failing to satisfy the inherent constraints, the value of the target function is set to a large positive number ($10^9$).

In step 2-3, the current power loss value is stored after a parallel distributed calculation, and a (k+1)-th switch is opened.

In step 2-4, it is determined whether k is greater than K; if k is greater than K, a switch with the minimum power loss value is identified as a tie switch; when the number of iterations reaches the number of branches in the ring-shaped loop topology structure, all obtained tie switches are set to an open state to form a radial network topology; and if k is not greater than K, step 2-2 is performed.

The graph computing state transition section is configured to perform S3-1 to S3-7.

In S3-1, the ring-shaped loop topology structure is input, all sectionalizing switches are converted to tie switches, and the latest topology structure is acquired by applying the multi-stage reconfiguration method based on the improved optimal flow pattern method and the branch exchange method. Moreover, sectionalizing switches other than sectionalizing switches of types I to III in the current topology structure are recorded as a set $\Omega_1$, and sectionalizing switches of type II are recorded as a set $\Omega_2$; where type I refers to a sectionalizing switch to which the shortest path from the current node to a substation node in the ring-shaped loop topology structure consists of $n_1$ or fewer than $n_1$ sectionalizing switches belongs; type II refers to a sectionalizing switch to which the shortest path from the current node to a substation node in the ring-shaped loop topology structure consists of $n_2$ or fewer than $n_2$ sectionalizing switches belongs; and type III refers to a sectionalizing switch that is not in a closed switch loop.

In S3-2, for sectionalizing switches outside the set $\Omega_1$, one sectionalizing switch is sequentially opened at a time, all the other switches are closed, the process of acquiring the radial network topology is performed, the one sectionalizing switch remains open until the radial network topology is formed, and the radial network topology and the corresponding power loss value are stored.

In S3-3, an open-close action is performed on sectionalizing switches in the set $\Omega_2$, and the open-close action includes opening one sectionalizing switch of type II and simultaneously closing one tie switch to maintain connectivity. For example, as shown in FIG. 2, when the switch between nodes 5 and 6 is opened, the tie switch 6-7 is closed to ensure connectivity.

In S3-4, an available open-close action is executed, a power loss optimization function is solved in a parallel distributed manner, a topology structure and a power loss value after the open-close action are recorded, and it is determined whether this open-close action reduces power loss; and if the power loss is reduced, the topology structure and the corresponding power loss value obtained after the open-close action are stored.

In S3-5, step S3-4 is performed for all sectionalizing switches in the set $\Omega_2$.

In S3-6, different topology structures obtained after executing different open-close actions and a power loss value corresponding to each topology structure are stored, and opened sectionalizing switches are closed.

In S3-7, steps S3-2 to S3-6 are repeated for the sectionalizing switches in the ring-shaped loop topology structure.

Other technical details corresponding to this system are the same as those of the method and are not repeated in this specification.

It is to be understood by those skilled in the art that embodiments of this application may be provided as methods, systems, or computer program products. Therefore, this application may take the form of an entirely hardware embodiment, an entirely software embodiment, or an embodiment combining software and hardware aspects. Moreover, this application may take the form of a computer program product embodied on one or more computer-usable storage media (including, but not limited to, a disk storage, a compact disc read-only memory (CD-ROM), and an optical storage) having computer-usable program code.

What is claimed is:

1. A method for multi-stage topology reconfiguration of a distribution network based on graph computing, comprising:

dividing a to-be-reconfigured distribution network into a plurality of grid regions by using a space of the distribution network or a structure of the distribution network;

obtaining different topology structures and a power loss value corresponding to each topology structure of the different topology structures by applying a multi-stage reconfiguration method based on an improved optimal flow pattern method and a branch exchange method to each grid region of the plurality of grid regions;

determining whether each topology structure and the power loss value corresponding to each topology structure satisfy a preset condition of a distribution network reconfiguration model, wherein the preset condition comprises: a target function aimed at minimizing power loss and inherent constraints; and in response to a power loss value corresponding to a topology structure satisfying the preset condition, storing the topology structure for each grid region; and inputting each divided grid region into a graph computing library, performing iterative training for graph computing by using a synchronous alternating direction method of multipliers until a reconfiguration process for switches in all the plurality of grid regions in the distribution network is completed, and outputting a result of the multi-stage topology reconfiguration of the distribution network;

wherein the multi-stage reconfiguration method based on the improved optimal flow pattern method and the branch exchange method comprises:

closing all switches in an initial topology of the distribution network to form a ring-shaped loop topology structure;

setting a number of iterations to a number of branches in the ring-shaped loop topology structure, in each of the iterations, sequentially opening the switches in the ring-shaped loop topology structure, calculating power loss values in a parallel distributed manner, and selecting a switch with a minimum power loss value as a tie switch; and after the iterations are completed, opening all obtained tie switches to acquire a radial network topology; and performing state transitions on sectionalizing switches and tie switches of the acquired radial network topology by using a switch pre-classification method to obtain a topology structure and a power loss value for each of the state transitions, and acquiring an optimal topology structure and a power loss value through parallel distributed computing;

wherein performing the state transitions on the sectionalizing switches and the tie switches of the acquired radial network topology by using the switch pre-classification method to obtain the topology structure and the power loss value for each of the state transitions, and acquiring the optimal topology structure and the power loss value through the parallel distributed computing comprises:

inputting the ring-shaped loop topology structure, converting all sectionalizing switches to tie switches, acquiring a latest topology structure by applying the multi-stage reconfiguration method based on the improved optimal flow pattern method and the branch exchange method, recording sectionalizing switches other than sectionalizing switches of types I to III in the current topology structure as a set $\Omega_1$, and recording sectionalizing switches of type II as a set $\Omega_2$; wherein type I refers to a sectionalizing switch to which a shortest path from a current node to a substation node in the ring-shaped loop topology structure consists of no more than $n_1$ sectionalizing switches belongs; type II refers to a sectionalizing switch to which a shortest path from the current node to the substation node in the ring-shaped loop topology structure consists of no more than $n_2$ sectionalizing switches belongs; and type III refers to a sectionalizing switch that is not in a closed switch loop;

for sectionalizing switches outside the set $\Omega_1$, sequentially opening one of the sectionalizing switches at a time, closing all other switches, executing a process for acquiring the radial network topology, keeping the one sectionalizing switch open until the radial network topology is formed, and storing the radial network topology and a corresponding power loss value;

performing an open-close action on the sectionalizing switches of type II in the set $\Omega_2$; wherein the open-close action comprises opening one of the sectionalizing switches of type II and simultaneously closing one tie switch;

executing an available open-close action, solving a power loss optimization function, recording a topology structure and a power loss value after the available open-close action, and determining whether the available open-close action reduces power loss; and in response to a reduction in the power loss, storing the topology structure and the corresponding power loss value obtained after the available open-close action; and storing different topology structures obtained after executing different open-close actions and a power loss value corresponding to each topology structure of the different topology structures, and closing opened sectionalizing switches.

2. The method for multi-stage topology reconfiguration of the distribution network based on graph computing according to claim 1, wherein in each of the iterations, sequentially opening the switches in the ring-shaped loop topology structure, calculating the power loss values in the parallel distributed manner, and selecting the switch with the minimum power loss value as the tie switch; and after the iterations are completed, opening all the obtained tie switches to acquire the radial network topology comprises:

inputting a ring-shaped loop topology structure corresponding to a current grid region, identifying all K switches, and initializing a current switch k;

opening a k-th switch in the ring-shaped loop topology structure, calculating a power loss value, and determining whether each node in the ring-shaped loop topology structure has a path to a substation and satisfies the inherent constraints;

in response to each node having the path to the substation and satisfying the inherent constraints, storing the current power loss value and opening a (k+1)-th switch; and in response to a node lacking the path to the substation or failing to satisfy the inherent constraints, setting a value of the target function to a large positive number; and determining whether k is greater than K; in response to k>K, finding a minimum power loss value and setting a corresponding branch switch to an open state to form the radial network topology.

3. The method for multi-stage topology reconfiguration of the distribution network based on graph computing according to claim 1, wherein the target function aimed at minimizing power loss is expressed as:

$$-C = \min \sum_{i=1,j=1}^{N} \left( \frac{p_{ij} + q_{ij}}{v_j} \right)^2 r_{ij} \, \forall \, i, \forall \, j \in N, \tag{1}$$

wherein $p_{ij}$, $q_{ij}$, and $r_{ij}$ denote active power between a node i and a node j, reactive power between the node i and the node j, and branch resistance between the node i and the node j, respectively, and $v_j$ and N denote a voltage of the node j and a number of load nodes, respectively.

4. The method for multi-stage topology reconfiguration of the distribution network based on graph computing according to claim 3, wherein the inherent constraints comprise:

power flow constraints, expressed as:

$$\begin{cases} p_{demand,i} + \sum_{i,j \in \Omega_b} v_i v_j (G_{ij}\cos\theta_{ij} + B_{ij}\sin\theta_{ij}) = 0 & (2a) \\ q_{demand,i} + \sum_{i,j \in \Omega_b} v_i v_j (G_{ij}\sin\theta_{ij} - B_{ij}\cos\theta_{ij}) = 0 & (2b) \\ (v_i v_j)^2 \left[ (G_{ij}\cos\theta_{ij} + B_{ij}\sin\theta_{ij})^2 + (G_{ij}\sin\theta_{ij} - B_{ij}\cos\theta_{ij})^2 \right] \leq \overline{S_{ij}}^2, & (2c) \end{cases}$$

wherein formula (2a) represents an active power balance of a node, which is a prerequisite for maintaining frequency stability in the distribution network, $p_{demand,i}$ and $v_i$ denote active power of the node i and a voltage of the node i, respectively, $G_{ij}$ and $B_{ij}$ denote a real part and an imaginary part of an admittance matrix at an $i^{th}$ row and a $j^{th}$ column, respectively, and fb denotes a set of all branches; formula (2b) represents a reactive power balance of the node, which is a prerequisite for maintaining voltage stability in the distribution network; and $g_{demand,i}$ denotes reactive power of the node i; formula (2c) represents a maximum transmission capacity limit between the node i and the node j, and $S_{ij}$ denotes a maximum apparent power; and distribution network current constraints, voltage constraints, and micro-turbine constraints, expressed as:

$$\begin{cases} v_{i,min} \leq v_i \leq v_{i,max} & (3a) \\ I_{ij,min} \leq I_{ij} \leq I_{ij,max} & (3b) \\ p_{g(i),min} \leq p_{g(i)} \leq p_{g(i),max} & (3c) \\ q_{g(i),min} \leq q_{g(i)} \leq q_{g(i),max}, & (3d) \end{cases}$$

wherein formula (3a) represents a voltage constraint of the distribution network, ensuring a safe operation of the distribution network and electrical equipment, $v_i$ denotes a voltage of the node i, $v_{i,max}$ and $v_{i,min}$ denote an upper voltage limit of the node i and a lower voltage limit of the node i, respectively, formula (3b) represents a branch current constraint from the node i to the node j, ensuring safety of lines, $I_{ij}$ denotes a branch current from the node i to the node j, $I_{ij,min}$ and $I_{ij,max}$ denote an upper current limit of a branch and a lower current limit of the branch, respectively, formula (3c) represents an active power output constraint of a micro-turbine, $p_{g(i)}$ denotes active power of the micro-turbine at the node i, $p_{g(i),max}$ and $p_{g(i),min}$ denote an upper active power limit of the micro-turbine at the node i and a lower active power limit of the micro-turbine at the node i, respectively, formula (3d) represents a reactive power output constraint of the micro-turbine, $q_{g(i)}$ denotes reactive power of the micro-turbine at the node i, and $q_{g(i),max}$ and $q_{g(i),min}$ denote an upper reactive power limit of the micro-turbine at the node i and a lower reactive power limit of the micro-turbine at the node i, respectively.

5. The method for multi-stage topology reconfiguration of the distribution network based on graph computing according to claim 4, wherein radiality and connectivity constraints satisfied during a process of the multi-stage topology reconfiguration of the distribution network are expressed as follows:

$$\begin{cases} N - n_b = 1 & (4a) \\ dis(i, i_{ge}) < \infty (i \neq i_{ge}), & (4b) \end{cases}$$

wherein $n_b$ denotes a number of branches, and $dis(i, i_{ge})$ denotes a distance from the node i to a substation node $i_{ge}$.

6. The method for multi-stage topology reconfiguration of the distribution network based on graph computing according to claim 5, wherein inputting the topology structure satisfying the preset condition for each divided grid region into the graph computing library, performing the iterative training for graph computing by using the synchronous alternating direction method of multipliers until the reconfiguration process for the switches in all the grid regions of the distribution network is completed, and outputting the result of the multi-stage topology reconfiguration of the distribution network comprises:

describing, by using a principle of graph theory, nodes and edges of the topology structure satisfying the preset condition for each divided grid region in a matrix form; wherein the nodes are connected through the edges, and communication information is exchanged through the edges;

wherein the distribution network consists of nodes and branches, the nodes are connected by the branches to transmit information, and the nodes and the branches of the distribution network form basic concepts of graph computing; by using basic principles of the graph computing, a structure of the distribution network is transformed into graph relationships, the nodes are set as vertices, and optimization data are stored in a graph database for parallel computing to improve computational efficiency; and each vertex is configured to perform optimal parallel optimization calculations for distribution network power losses based on information transmitted from adjacent vertices and update boundary information based on an optimization result;

the acquired topology structure is transformed into the graph relationships, each node in the topology structure is set as a vertex, and optimization data are stored in the graph database to improve computational efficiency; and each vertex is configured to perform optimal parallel optimization calculations for distribution network power losses based on information transmitted from adjacent vertices and update boundary information based on an optimization result;

acquiring a compact form of power loss for the multi-stage topology reconfiguration of the distribution network, expressed as:

$$\begin{cases} \min & f(x_n) \\ \text{s.t.} & (2)\sim(4) \end{cases}, \tag{5}$$

wherein $f$ is an expression of the target function, and $x_n$ denotes a decision variable for an n-th grid region;

performing distributed computing on optimized data in the graph database and introducing the synchronous alternating direction method of multipliers into the distribution network reconfiguration;

expressing, according to a definition of a function $h(z_n)$, a final iterative form of the synchronous alternating direction method of multipliers as follows:

$$\begin{cases} x_n^{k+1} & = \arg\min_{x_n} \left\{ f(x_n) + \frac{\tau}{2} \left\| x_n^{ex} - x_n^{ex,k} + \bar{x}^{ex,k} + w^k \right\|_2^2 \right\} \\ w^{k+1} & = w^k + \bar{x}^{ex,k+1} \end{cases},$$

wherein $\tau$ and $w$ denote a Lagrange penalty factor and a Lagrange multiplier respectively, $$x_n^{ex}$$

denotes exchanged power of an n-th grid region, $$x_n^{ex,k}$$

denotes exchanged power of the n-th grid region at a k-th iteration, and $$\bar{x}^{ex,k}$$

denotes average exchanged power at the k-th iteration; a principle of discrete consistency theory, in response to a Laplacian matrix having L non-zero eigenvalues, obtaining an average value of power exchange of a node after L iterations; and defining a residual that $$\varsigma^{k+1} = \left\| x_n^{k+1} - x_n^k \right\|_2^2 \leq \varsigma_{min}$$

at a (k+1)-th iteration, and outputting the result of the multi-stage topology reconfiguration of the distribution network until all the plurality of grid regions in the distribution network converge and the distribution network converges.

* * * * *